(12) United States Patent
Ianni et al.

(10) Patent No.: US 9,064,262 B2
(45) Date of Patent: Jun. 23, 2015

(54) METHOD AND APPARATUS FOR EXCHANGE OF INFORMATION

(75) Inventors: Bruce C. Ianni, Mission Hills, KS (US);
Laura A. Knox, Merriam, KS (US);
Alec E. Miller, Lawrence, KS (US);
Adam K. Miller, Kearney, MO (US);
Derek A. White, Kearney, MO (US)

(73) Assignee: Innovadex LLC, Overland Park, KS (US)

( * ) Notice: Subject to any disclaimer, the term of this patent is extended or adjusted under 35 U.S.C. 154(b) by 608 days.

(21) Appl. No.: 13/349,808

(22) Filed: Jan. 13, 2012

(65) Prior Publication Data

US 2012/0185545 A1 Jul. 19, 2012

Related U.S. Application Data

(60) Provisional application No. 61/434,229, filed on Jan. 19, 2011.

(51) Int. Cl.
| | |
|---|---|
| *G06Q 30/02* | (2012.01) |
| *H04L 29/06* | (2006.01) |
| *G06Q 10/10* | (2012.01) |
| *H04L 12/58* | (2006.01) |
| *H04L 29/08* | (2006.01) |

(52) U.S. Cl.
CPC .............. *G06Q 30/02* (2013.01); *H04L 51/20* (2013.01); *H04L 63/10* (2013.01); *H04L 51/32* (2013.01); *H04L 67/306* (2013.01); *G06Q 10/10* (2013.01)

(58) Field of Classification Search
CPC ... H04L 12/58; H04L 12/5825; H04L 12/583; H04L 12/5835; H04L 12/5855; H04L 12/5865; H04L 12/588; H04L 12/589; H04L 12/5895; H04L 51/00; H04L 51/06; H04L 51/063; H04L 51/066; H04L 51/14; H04L 51/20; H04L 51/22; H04L 51/28; H04L 51/32; H04L 51/36; H04L 51/38; H04L 61/15; H04L 61/1547; H04L 61/1564; H04L 61/30; H04L 61/3015; H04L 29/12018; H04L 29/12047; G06Q 10/10
See application file for complete search history.

(56) References Cited

U.S. PATENT DOCUMENTS

| | | | | |
|---|---|---|---|---|
| 7,966,194 | B2 * | 6/2011 | Iyer | 705/1.1 |
| 8,209,310 | B1 * | 6/2012 | Metcalfe | 709/204 |
| 2002/0111845 | A1 * | 8/2002 | Chong | 705/8 |
| 2006/0141981 | A1 * | 6/2006 | Lin | 455/403 |
| 2006/0206381 | A1 * | 9/2006 | Frayman | 705/14 |
| 2008/0279117 | A1 * | 11/2008 | Brisco et al. | 370/259 |
| 2008/0312946 | A1 * | 12/2008 | Valentine et al. | 705/1 |
| 2009/0041353 | A1 * | 2/2009 | Hoff et al. | 382/183 |
| 2010/0131502 | A1 * | 5/2010 | Fordham | 709/207 |

(Continued)

*Primary Examiner* — Patrice Winder
(74) *Attorney, Agent, or Firm* — Dentons US LLP; Brian R. McGinley

(57) ABSTRACT

A computer-implemented method for transmitting information comprises receiving, by a server, contact information about a participant; assigning, by the server, an identification to the participant; associating, by the server, the identification with the contact information of the participant; allowing, by the server, use of the identification on a network, wherein the network is limited to a geographic region; receiving, by the server, a request transmitted over the network to send a message to the participant, wherein the request comprises the identification of the participant; determining, by the server, a method of communication of the participant based upon the identification in the request; and transmitting, by the server, the message to the participant using the preferred communication method.

16 Claims, 28 Drawing Sheets

(56) References Cited

U.S. PATENT DOCUMENTS

| | | | |
|---|---|---|---|
| 2010/0153286 A1* | 6/2010 | Caswell et al. | 705/319 |
| 2011/0066366 A1* | 3/2011 | Ellanti et al. | 701/201 |
| 2011/0314104 A1* | 12/2011 | Gray | 709/205 |
| 2012/0191861 A1* | 7/2012 | Bennett et al. | 709/227 |
| 2013/0318167 A1* | 11/2013 | Sereboff et al. | 709/204 |
| 2014/0229618 A1* | 8/2014 | Kumar et al. | 709/225 |

* cited by examiner

FIG. 10

| Reg/Cyb | Site | User Status | ML | First Name | Last Name | Employer | Email |
|---|---|---|---|---|---|---|---|
| NA/H&I | Innovadex | Active | N | Anne | Kelley | Brenntag, Inc. | a.kelley@brenntag.com |
| NA/P&C | Innovadex | Active | N | Wayne | Kelley | Brady Corporation | wayne_kelley@bradycorp.com |
| NA/P&C | Innovadex | Active | N | Fran | Kelley | Dow Chemical - Electronic Materials | f.kelley@rohmhaas.com |

1810 — Reg/Cyb
1820 — Site
1830 — User Status
1840 — ML / First Name / Last Name
1850 — Employer
1860 — Email
1800

*Fig. 18*

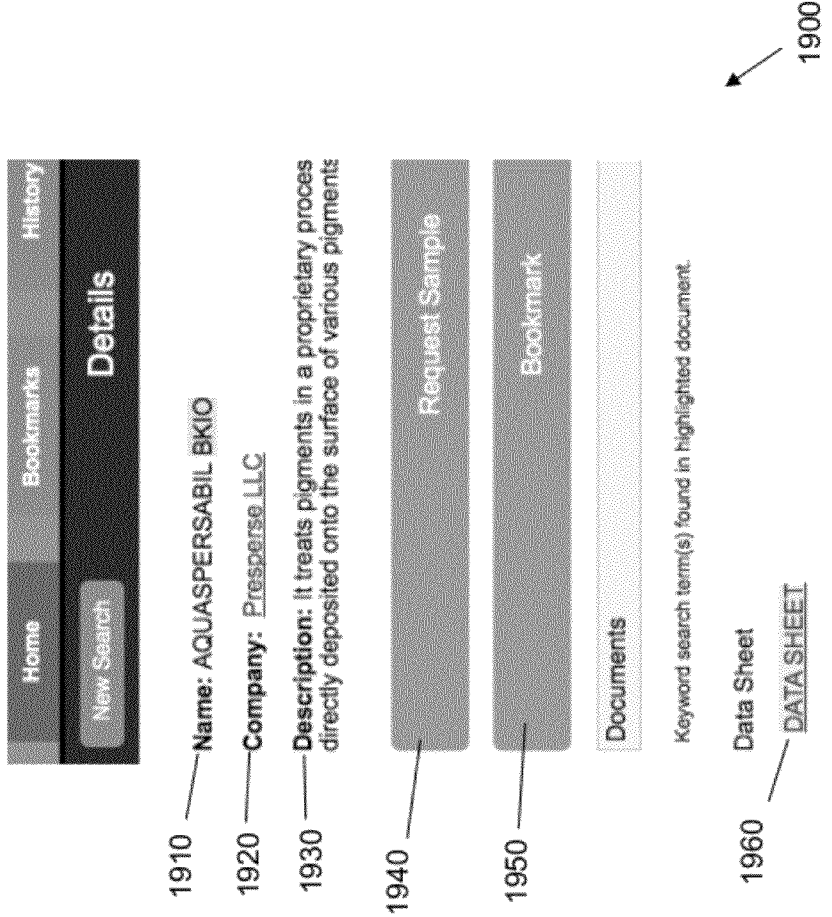

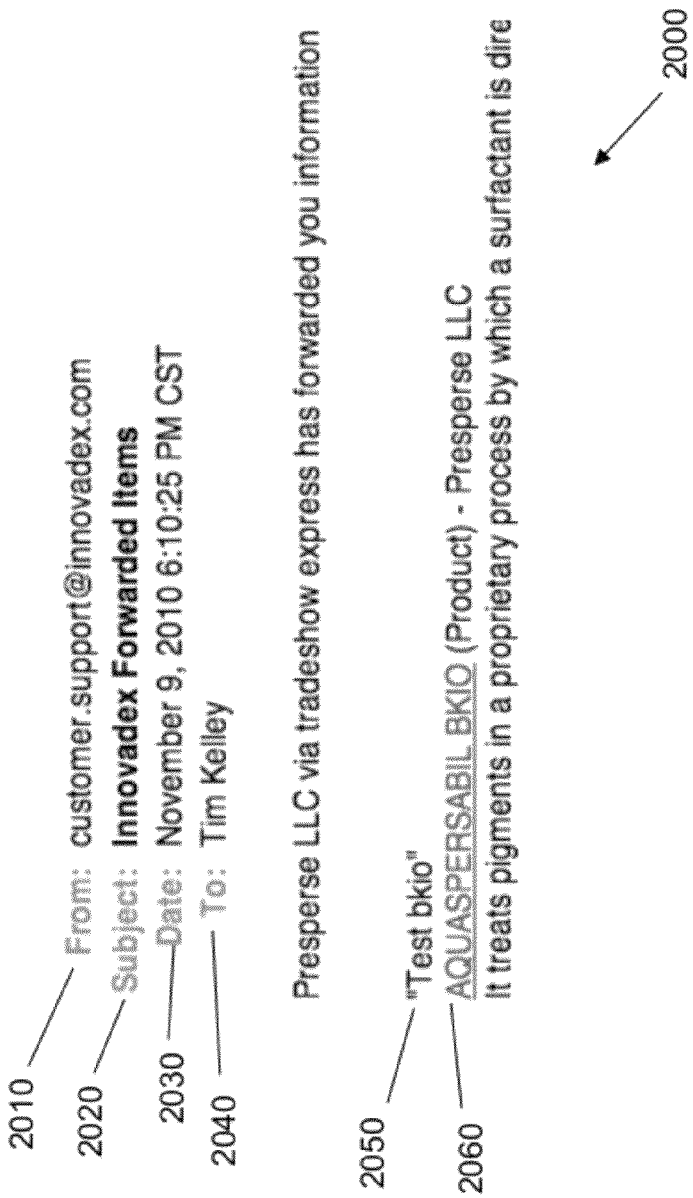

FIG. 21

| Company ▲ | Event ▲ | Sender ▲ | Date ▲ |
|---|---|---|---|
| ADM (5) | NYSCC Supplier's Day Expo | Cara Eaton | 5/11/11 |
| Air Products (3) | NYSCC Supplier's Day Expo | Amy Dolzine | 5/11/11 |
| Air Products (4) | NYSCC Supplier's Day Expo | Julie Shlepr | 5/11/11 |
| Beneo (3) | NYSCC Supplier's Day Expo | Alecia Gibson | 5/12/11 |
| Procter & Gamble (5) | N/A | Ken Kyte | 5/12/11 |
| Zeneca (1) | N/A | Peter Shields | 1/2/11 |

| Company ▲ | Event ▲ | Sender ▲ | Date ▲ |
|---|---|---|---|
| ADM (5) | NYSCC Supplier's Day Expo | Cara Eaton | 5/11/11 |
| Air Products (3) | NYSCC Supplier's Day Expo | Amy Dolzine | 5/11/11 |
| Air Products (4) | NYSCC Supplier's Day Expo | Julie Shlepr | 5/11/11 |
| Beneo (3) | NYSCC Supplier's Day Expo | Alecia Gibson | 5/12/11 |
| ISOMALT | Pleasantly Sweet, Kind To Teeth, Low In Calories And Very Low Glycemic – With These Benefits, ISOMALT Is Convincing More And More Health-Conscious Consumers Worldwide. This Is Why ISOMALT Is Used In An Ever Growing Number Of Premium Quality Confectionery And Food Products – As The Ideal Alternative For Conventional Sugars And Sweeteners. | | |
| NUTRIZ | Nutriz Combines Rice Components To Your Needs. Principle Ingredients Of The Nutriz Product Range Are Rice Flour, Rice Starch, And Rice Syrup, With Protein And, In Case Of The Rice Concentrate Nutriz M, Also An Oil Component From Rice. | | |
| ISOMALT SENSORY INFORMATION (English) – Application Information | | | |
| Procter & Gamble (5) | N/A | Ken Kyte | 5/12/11 |
| Zeneca (1) | N/A | Peter Shields | 1/12/11 |

2800, 2810, 2820, 2830, 2840

METHOD AND APPARATUS FOR EXCHANGE OF INFORMATION

CROSS-REFERENCE TO RELATED APPLICATIONS

This application claims priority to U.S. Provisional Patent Application Ser. No. 61/434,229, entitled "Method and Apparatus for Exchange of Information," filed Jan. 19, 2011, which is hereby incorporated by reference in its entirety.

FIELD

The present invention relates to methods and apparatus for the exchange of information between two or more persons or organizations, such as at a trade show or the like.

BACKGROUND

Trade fairs traditionally have provided a forum for members of a particular industry to showcase their wares and recent development activities while studying those of competitors. Consumer fairs are similar but additionally provide a forum for members to sell and display products and disseminate information to the consuming public.

Over the last decade, however, studies show that average tradeshow attendance has dropped by more than one-third. Experts suggest that factors which might contribute to this decline include corporate budget cuts, rising travel expenses, concerns over impacts on productivity, and the preference of stay-at-home internet research over attendance to the shows.

In the wake of diminishing attendance and rising costs to tradeshow exhibitors, administrators have sought new ways in which to draw exhibitors and consumers to their shows. Experts have suggested smaller tradeshows, round-table discussions, and other strategies which focus on appealing to specific groups of attendees rather than simply providing another form of mass advertising to consumers.

One reason why these approaches have been suggested is that tradeshow attendees have recently displayed a shift in objectives they hope to achieve by attending the events. Namely, one renowned expert in tradeshows has opined that attendees are now more than ever seeking to obtain new strategies, tactics, and the skills necessary to improve their business." Similar polls of attendees show that the majority attend to obtain credible and reliable information.

More recently, experts have sought to address these needs by encouraging exhibitors to have industry experts or analysts to present information to attendees, rather than simply having salesmen make sales pitches. Further, these experts have suggested exhibitors move away from traditional lecture style formats, as well as select more innovative topics for discussion which might provide a source of new and useful information to attendees.

SUMMARY

In light of the foregoing, a method or system is desired for conducting a tradeshow that responds to the evolving requirements of attendees. Accordingly, embodiments described herein attempt to provide an integrated method that expands access to any electronic information, improves the speed with which that information is effectively linked and provided to individuals having need of it, and reduces overhead costs associated with traditional methods for conducting tradeshows. The embodiments described herein also attempt to more efficiently track customer leads, timing and notification of attendee interest, and customer requests.

In one embodiment, a computer-implemented method for transmitting information comprises receiving, by a server, contact information about a participant; assigning, by the server, an identification to the participant; associating, by the server, the identification with the contact information of the participant; allowing, by the server, use of the identification on a network; receiving, by the server, a request transmitted over the network to send a message to the participant, wherein the request comprises the identification of the participant; determining, by the server, a method of communication of the participant based upon the identification in the request; and transmitting, by the server, the message to the participant using the method of communication.

In another embodiment, a computer program product comprising a tangible computer readable medium having computer readable program code embodied therein, the computer readable program code adapted to be executed to implement a method for transmitting information, the method comprises providing a system, wherein the system comprises distinct software modules, and wherein the distinct software modules comprise an access module, a collection module, and a report module; determining, by the access module, whether a user is entitled to access the system using a computing device connected to a network; collecting, by the collection module, information regarding users, a product or service, and activities between users accessing the system; and generating, by the report module, a report based upon collected information regarding users, the product or service, and activities between users accessing the system.

In yet another embodiment, a computer-implemented method for transmitting information comprises executing, by a computing device, an application for managing information about a product or service; establishing, by the computing device, a connection to a geographically-limited network; receiving, by the computing device, a search request for a particular product or service; transmitting, over the network by the computing device, the search request to a server for determining whether a database comprises information about the particular product or service; receiving, over the network by the computing device, search results from the server that comprise information about the particular product or service; displaying, by the computing device, the search results on a screen of the computing device; receiving, by the computing device, a selection of at least a portion of the search results; retrieving, over the network by the computing device, information based upon the selection of at least a portion of the search results; displaying, by the computing device, the selected information on the screen of the computing device; receiving, by the computing device, a request to transmit the selected information to a recipient; generating, by the computing device, a message incorporating the selected information; receiving, by the computing device, an identification of the recipient for transmitting the message, wherein the identification does not include the name or email address of the recipient; transmitting, over the network by the computing device, the message to the recipient, whereby a server receives the message and converts the identification to an email address, an SMS text message address, or a website User ID based upon an association of the email address, SMS text message address, or the website User ID with the identification of the recipient; and receiving, over the network by the computing device, an indication that the recipient has viewed the information in the message.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims. A more complete appreciation of the invention and many of the advantages thereof will be readily obtained as the same becomes better understood by references to the detailed description when considered in connection with the accompanying drawings, wherein:

FIG. 10 depicts a screen on a computing device according to an exemplary embodiment.

FIG. 18 depicts a screen on a computing device according to an exemplary embodiment.

FIG. 19 depicts a screen on a computing device according to an exemplary embodiment.

FIG. 20 depicts a screen on a computing device according to an exemplary embodiment.

FIG. 21 depicts a screen on a computing device according to an exemplary embodiment.

FIG. 27 depicts a screen on a computing device according to an exemplary embodiment.

FIG. 28 depicts a screen on a computing device according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention. Therefore, specific structural and functional details disclosed herein are not to be interpreted as limiting, but merely as a basis for the claims and as a representative basis for teaching one skilled in the art to variously employ the present invention in virtually any appropriately detailed structure.

The exemplary embodiments discussed herein recite the use of methods and systems at an event, though it is intended that the event can be any trade show, trade fair, consumer show, consumer fair, auto show, job fair, networking event, conference, symposium, seminar, forum, meeting, one-on-one meeting, group presentation, or any other event where people gather and desire to exchange information. In the exemplary embodiment, an event has two types of participants: a vendor and an attendee. However, it is intended that the vendor can be any entity that sets up a booth, presents, or otherwise offers information, products, or services at the event, such as an exhibitor, presenter, or sales representative. The attendee can be any person that attends the event to obtain information, products, or services, and may seek the information, products, or services from one or more vendors, such as a customer.

Figure 1:
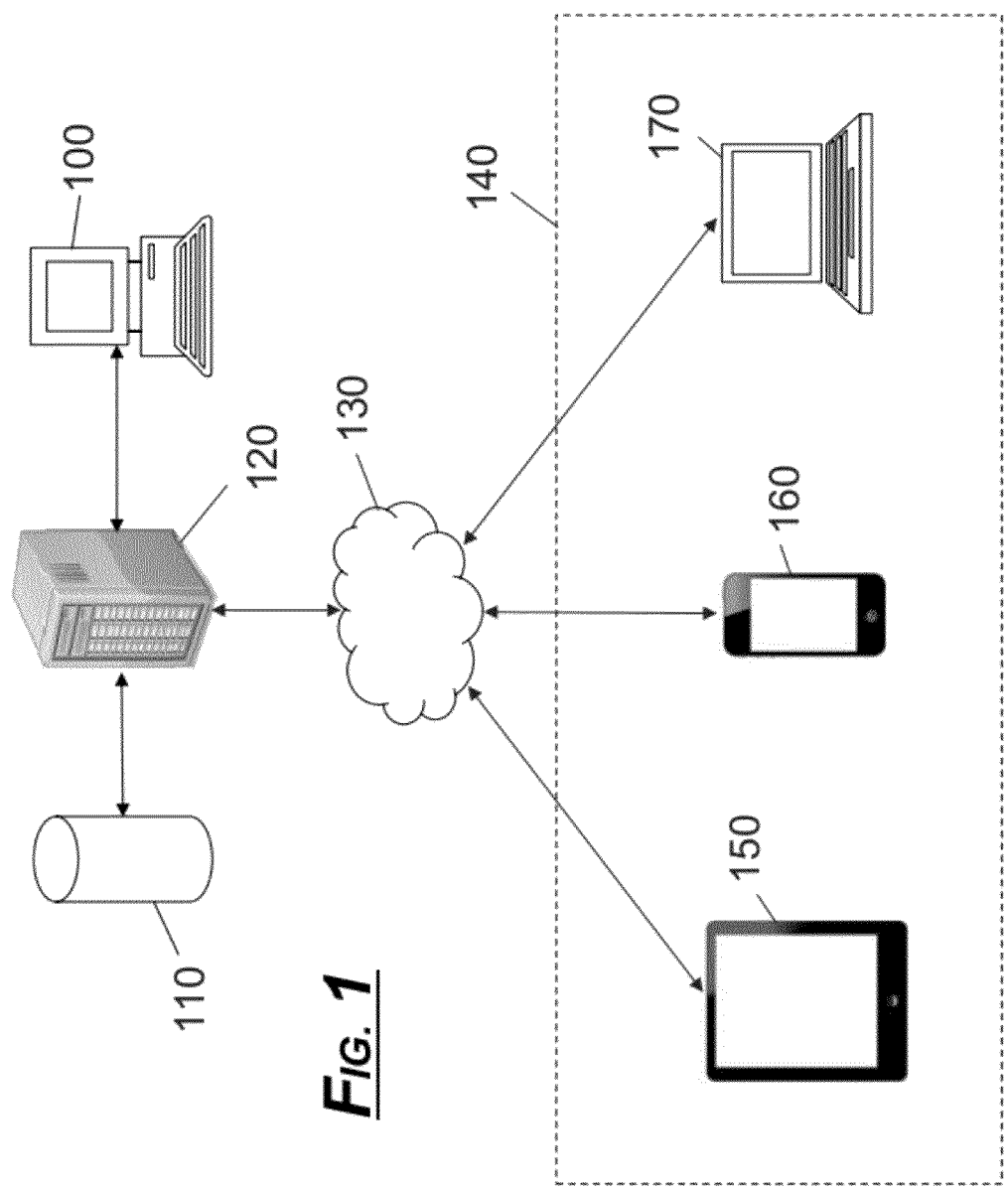
FIG. 1 depicts a system overview according to an exemplary embodiment.

Referring to FIG. 1, a system overview is shown. A workstation 100 is used to program or manage a database 110 and a server 120. Although the exemplary embodiment shows the workstation 100, server 110, and database 120 as separate components, it is understood that these components can be combined into one or more components, or each component can comprise one or more components.

The database 110, such as a SQL database, can store records regarding vendors at an event and attendee at the event. In one embodiment, the database can store records having information for products or services of the vendors, whereby the information in the database 110 can be made available to vendors and attendees at the event. In one alternative embodiment, the information about a particular vendor is only available to the vendor and a set of attendees. In another alternative embodiment, the information about the vendor's products and services can be stored in a database hosted by the vendor, and the records in database 110 can store contact information about each vendor. Vendor contact information can include, but is not limited to, a representative name, company name, website, mailing address, e-mail address, telephone number, facsimile number. Upon registration for the event, an administrator can create and store vendor contact information in records in the database 110. Alternatively, the vendors can create their own records for storage in the database 110. The database 110 can be populated with records or links to supplier-secured, firewall protected records regarding information about the vendor's products and services before the event so that it is accessible during the event.

In another embodiment, the database 110 can store a record for each attendee at the event, including each attendee's contact information. Attendee contact information can include, but is not limited to, a name, company name, website, mailing address, e-mail address, telephone number, facsimile number. Upon registration for the event, an administrator can create and store attendee contact information in records in the database 110. Alternatively, the attendees can create their own records for storage in the database 110. The database 110 can be populated with records regarding contact information for the vendors and attendees before the event so that it is accessible during the event.

Figure 16:
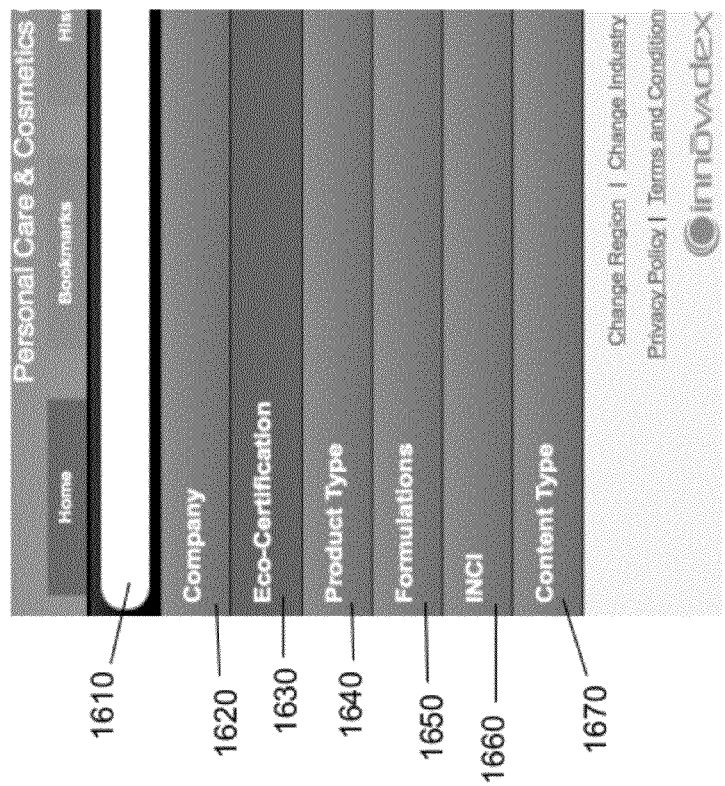
FIG. 16 depicts a screen on a computing device according to an exemplary embodiment.

There are numerous ways to access the information stored in the database. Referring to FIG. 16, a screen 1600 is shown for accessing product or service information from the database. In this exemplary embodiment, a database has a listing of products for personal care and cosmetics. A search field 1610 allows a vendor or attendee to search for a specific keyword or phrase. Categories, such as company 1620, eco-certification 1630, product type 1640, formulations 1650, INCI (International Nomenclature of Cosmetic Ingredients) 1660, and content type 1670 allow a vendor or attendee or browse products and services according to a hierarchical structure organized by certain categories.

Figure 17:
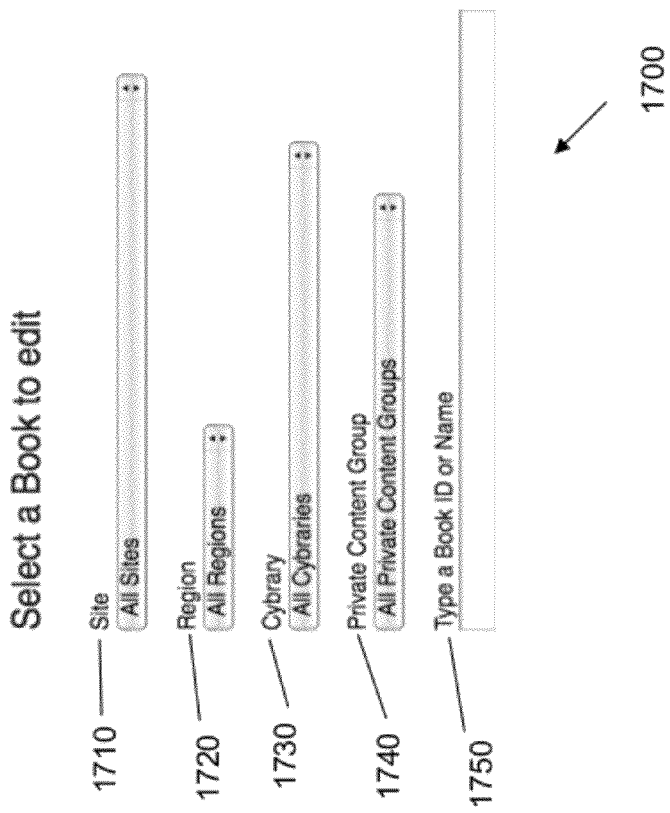
FIG. 17 depicts a screen on a computing device according to an exemplary embodiment.

The information in the database can also be edited, revised, deleted, replaced, generated, and stored. Referring to FIG. 17, a content documentation screen 1700 is shown whereby information can be classified, selected, and edited based upon site 1710, region 1720, a network-based catalog 1730 (e.g., a CYBRARY® catalog that can provide information via a website on global computer networks in the form of an on-line database featuring technical data relating to raw material chemicals and to food and beverage ingredients), private content group 1740, and a book ID or name.

The contact information in the database can include registration information, contact information, and interests of participants based upon discussions, data entered by another participant, or data entered during registration by the participant. Referring to FIG. 18, a screen 1800 is shown whereby each participant is listed with a region or network-based catalog 1810, a site 1820, a user status 1830, user name 1840, an employer 1850, and e-mail address 1860. Other information (not shown) can also be included in these records. This information can be collected, stored, and updated in real time at an event. The information can be grouped by an attendee, but can also be sorted by any column or category of information.

Each record in the database 110 for an attendee and/or a vendor can be associated with an identification number, graphic, or other alphanumeric characters or visual representation. For example, each attendee can be associated with a mutli-digit number that is stored in the database. In another example, each attendee can be associated with a barcode, UPC, SKU, or QR code. At the event, an attendee or a vendor can be identified by the identification stored in the database 110. In one embodiment, an attendee can have the identification on a nametag, which another attendee or vendor can use to identify the attendee. In another embodiment, an attendee can have a bar code on a nametag, which another attendee or vendor can scan to identify the attendee.

The server 120 can have one or more modules used to execute a particular function of the server 120. For example, a login and access module associated with the database 110 can provide access to, link, and provide information amongst vendors and attendees that have the appropriate login credentials; a module for electronically collecting and categorizing information in real time in connection with event activities; and a module for the creation and storage of electronic reports selectively displaying information from the database 110.

The server 120 is coupled to a network 130, such as a local area network, a wide area network, or a high bandwidth internet connection. In an exemplary embodiment, the network 130 is only available to a geographic region 140, such as a convention center, a room, a campus, or a building, so that the network 130 is only available at the event. In one example, the network is a Wi-Fi network that allows vendors and attendees to access the network using a network ID and password. Any devices outside of the geographic region 140 will not have access to the network 130 and, thus, the information in the database 110. In another example, devices can access the network 130 using a wired connection, such as using Ethernet for a local area network. Although the exemplary embodiment may discuss the use of a geographically-limited network, it is intended that the systems and methods can also be implemented using a network that is not geographically-limited or has fewer geographic constraints. For example, in an alternative embodiment, the network can be a cellular or other mobile carrier network, such as a 3 G or 4 G cellular network.

While connected to the network 130, attendees and vendors can access the server 110 when it is desirable to identify another attendee or vendor, when the attendees and vendors desire to communicate with another attendee or vendor, and/or when the attendees and vendors desire to access information (e.g., product or services) offered by a particular vendor. As described in more detail below, the attendees and vendors can use the identification (e.g., multi-digit number or a barcode) of the attendee or vendor to obtain the attendee's or vendor's contact information, send a message to the attendee or vendor, or access the vendor's product catalog.

Participants, including both the vendors and the attendees, at the event can access the network 130 to interact with the server 120 and database 110 using a mobile device, such as a tablet computer 150, smartphone 160, or a laptop computer 170. The vendors and attendees can use any type of computing device that is capable of accessing a network through a wired or wireless connection.

Figure 2:
FIG. 2 depicts a screen on a computing device according to an exemplary embodiment.

Referring to FIG. 2, a screen 200 is shown for an exemplary computing device (shown as a tablet computer) of a vendor or an attendee. Once the computing device establishes a network connection, the vendor or attendee can click on an icon 210 to launch an application (or "app"). In this exemplary embodiment, the application is a separate application, but it is intended that the application can alternatively be launched as a website through the use of a web browser. The application is stored on the tablet computer and executes on the tablet computer, but the application may communicate with the server and database for information about products or services of a vendor or contact information of a vendor or attendee.

Figure 3:
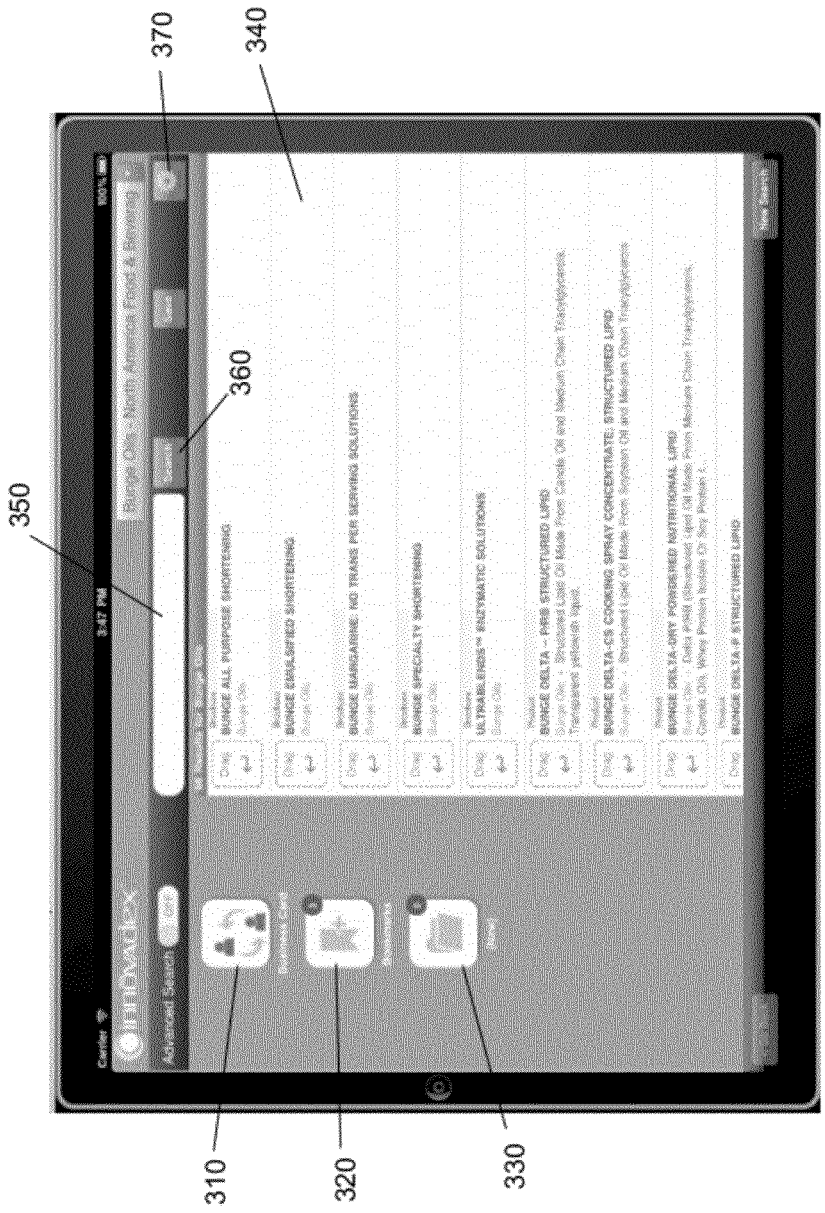
FIG. 3 depicts a screen on a computing device according to an exemplary embodiment.

During the event, the vendor or attendee can access information in the database regarding products or services offered by a vendor or contact information. Referring to FIG. 3, once the icon is selected, an application is launched with a screen 300. The screen 300 has three options on the side, including "business card" icon 310, "bookmarks" icon 320, and "(new)" icon 330. A substantial portion of the screen 300 can be devoted to a search results list 340, whereby a search of a vendor's products or services in a field 350 will provide search results in list 340. The business card icon 310 can be used if a vendor or attendee desires to exchange contact information with another vendor or attendee. The bookmarks icon 320 can be used to mark or recall a search results list 340 or another website. The new icon 330 can be used to create a folder for storing information about one or more searches or information about vendors or attendees. A settings icon 370 allows a user to view and adjust settings and various options for the application.

Figure 4:
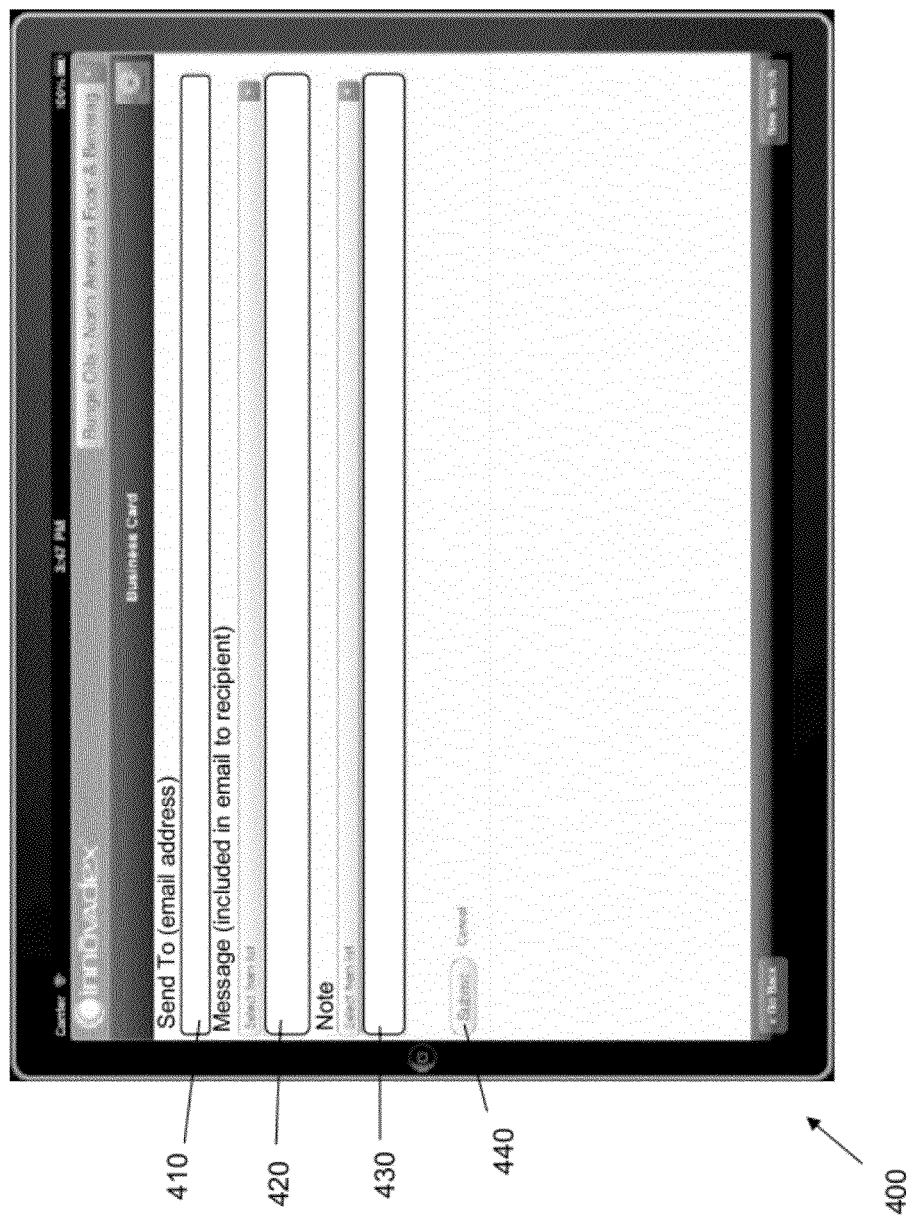
FIG. 4 depicts a screen on a computing device according to an exemplary embodiment.

Once the business card icon 310 is selected, a screen 400 shown in FIG. 4 is presented. Screen 400 has a template for sending a message. A "send to" field 410 can be used to enter an e-mail address, multi-digit number, or electronic scanner read information of a recipient, i.e., the other person that would like to receive the contact information of the sender. A "message" field 420 can be used to include a message to the recipient. A "note" field 430 can be used to include a note. Once the message is finalized, the sender can click on a "submit" button 440 to send the message.

Figure 5:
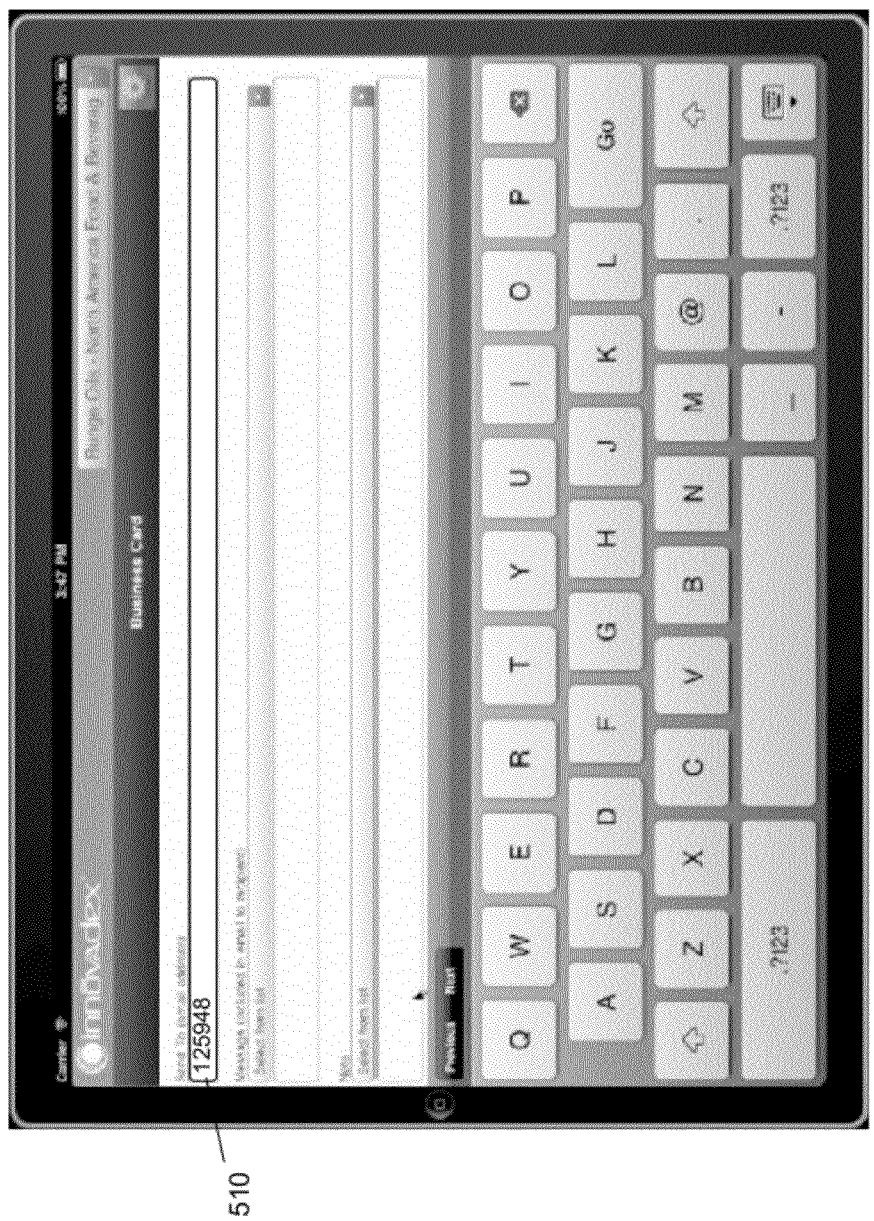
FIG. 5 depicts a screen on a computing device according to an exemplary embodiment.

Referring to FIG. 5, a recipient can be entered into the "send to" field 510. The recipient's email address can be used or other identification of the recipient. In this exemplary embodiment, the sender can enter a multi-digit code that identifies the recipient and may have been obtained from the recipient's nametag. As shown in FIG. 5, the sender enters 125948 in field 510. The server can recognize this recipient and, when sending the message, look for the email address in the database that is associated with this multi-digit identification number. Other electronic identification methods can be used, such as a bar code scanner and a QR code reader.

In one embodiment, the sender is not able to view the recipient's email address, but can send an email message by using the identification (e.g., six digit identification number). The server will forward the email message accordingly. In this alternative embodiment, only an administrator can access information such as an email address, which may be designated as "private" so that it is not shared with all other vendors and attendees. The email address or other private designated information may become accessible to a sender once an email has been viewed from that sender, when the recipient requests the senders contact information, or when some other trigger occurs that designates that information as available to the connected participant.

Figure 6:
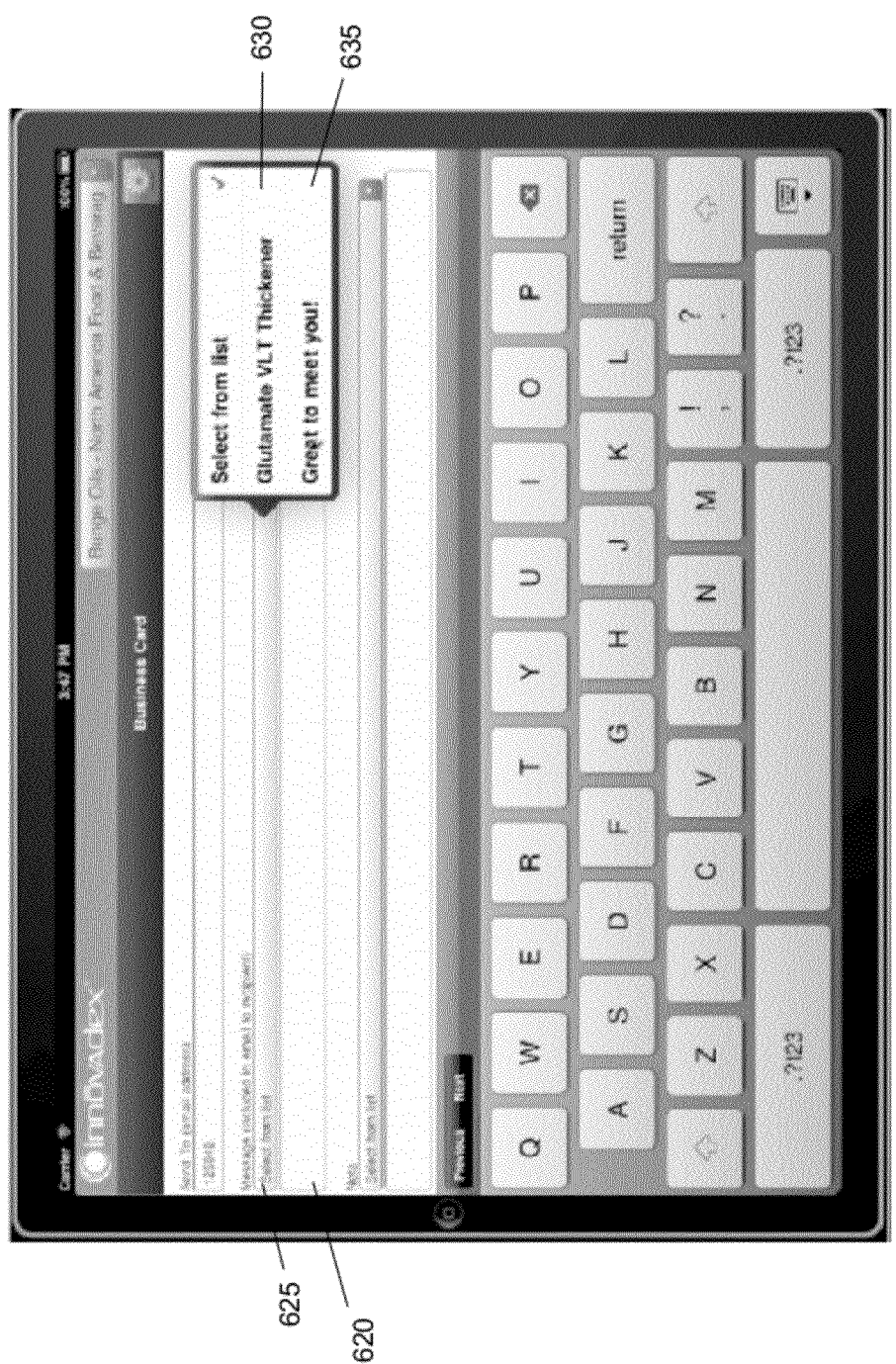
FIG. 6 depicts a screen on a computing device according to an exemplary embodiment.
Figure 7:
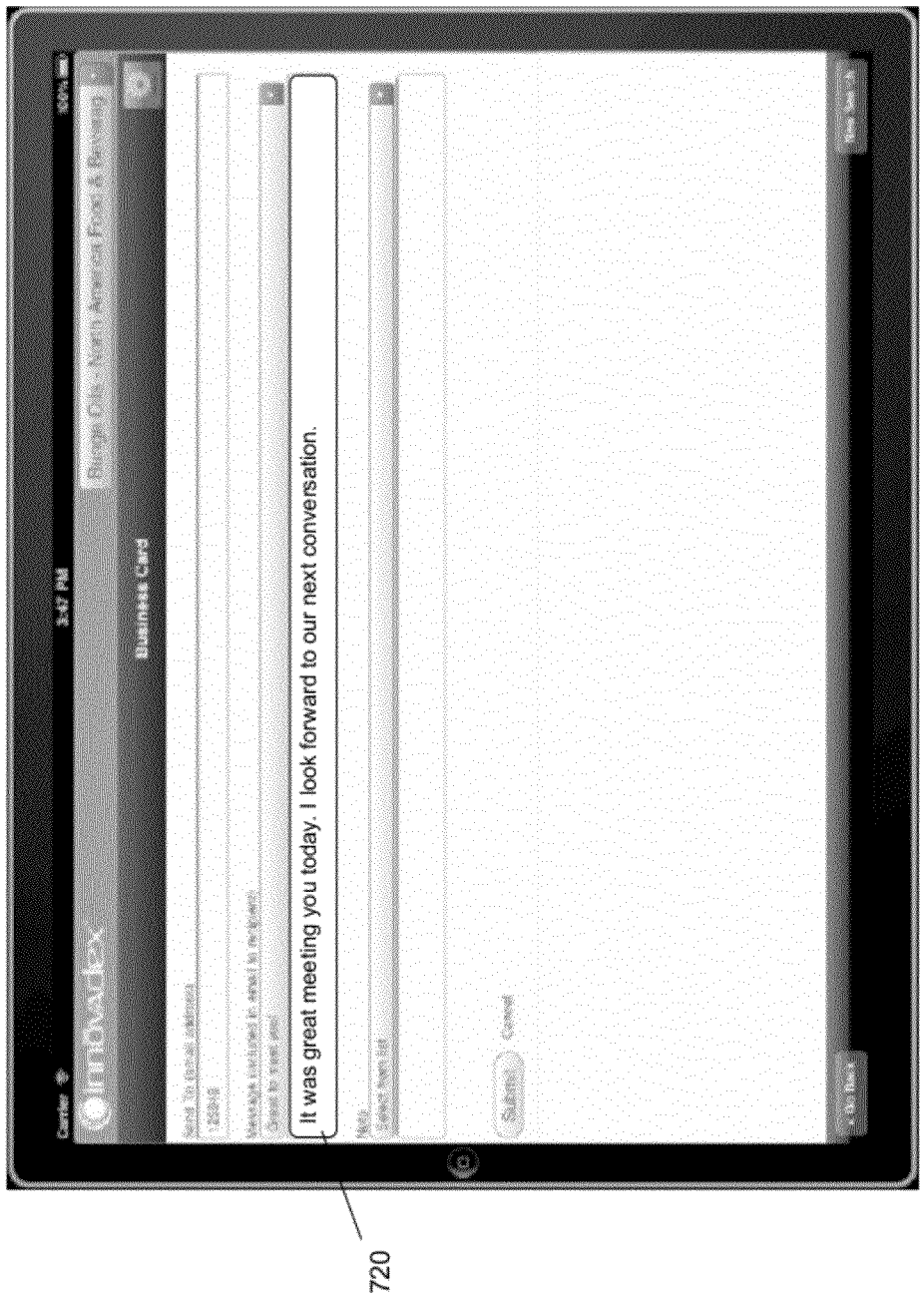
FIG. 7 depicts a screen on a computing device according to an exemplary embodiment.

Referring to FIG. 6, the sender can write a custom message in field 620 or select from a list of available messages in a dropdown list 625. The message is a textual or graphical section that will be sent to the recipient. In this exemplary embodiment, the dropdown list 625 has options to include a message about "Glutamate VLT Thickener" 630 and "Great to meet you!" 635. As shown in FIG. 7, when the "Great to meet you!" option 635 is selected, field 720 is populated with a message that says "It was great meeting you today. I look forward to our next conversation." The pre-written messages can be tailored to say anything that a host, administrator, vendor, attendee, or other participant desires.

Figure 8:
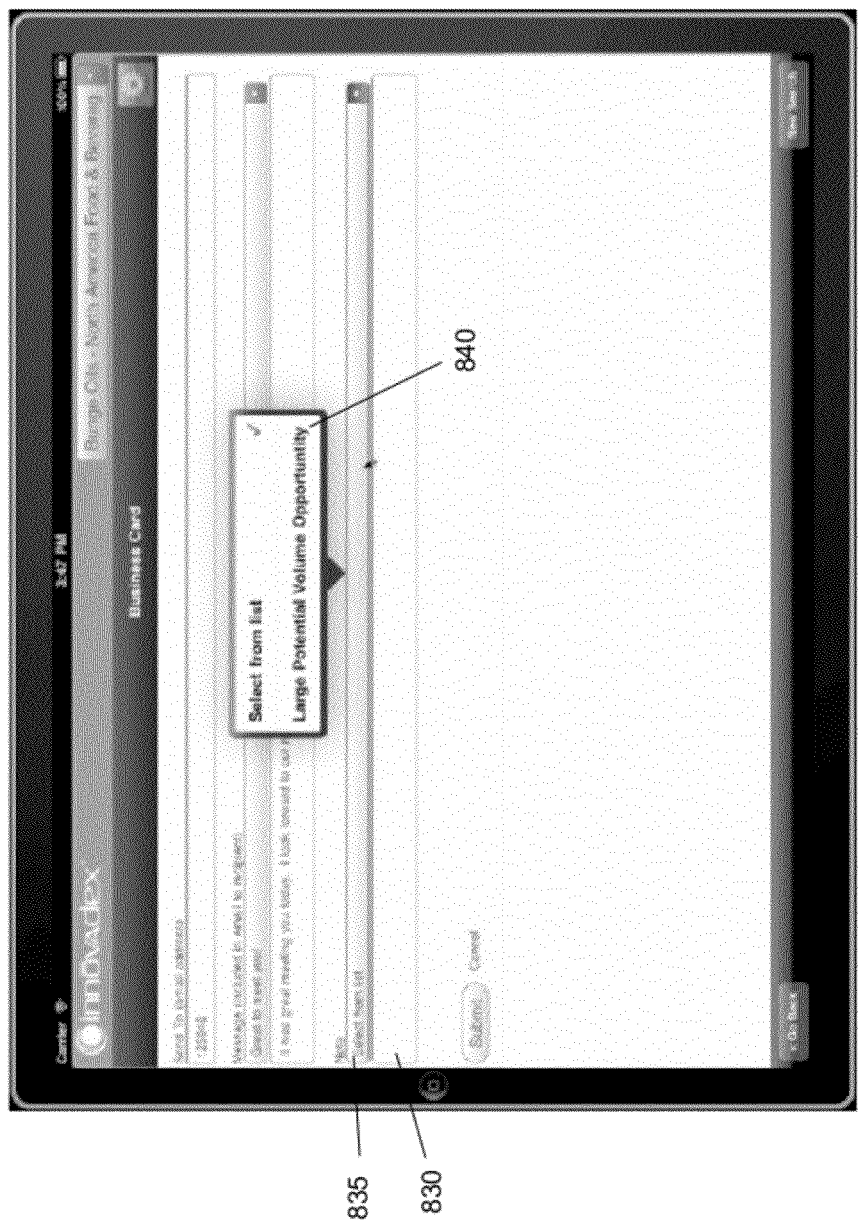
FIG. 8 depicts a screen on a computing device according to an exemplary embodiment.
Figure 9:
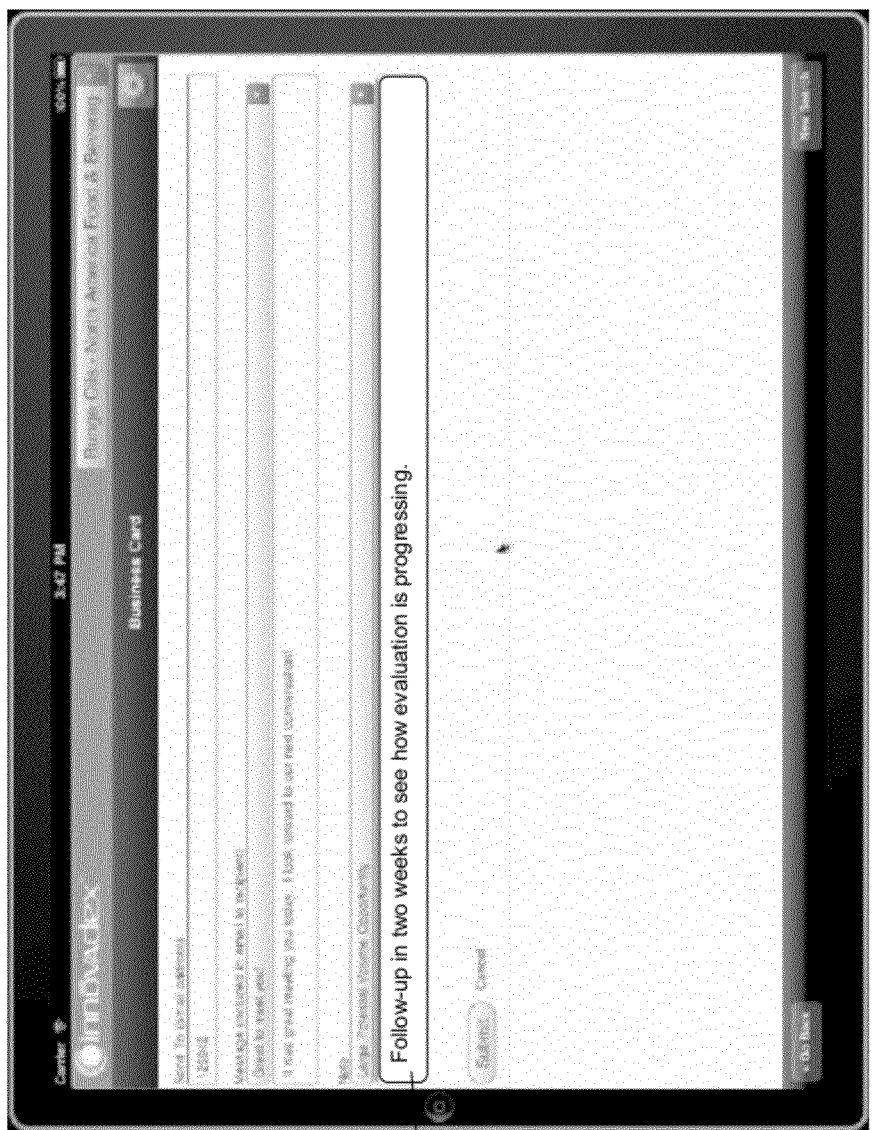
FIG. 9 depicts a screen on a computing device according to an exemplary embodiment.

Referring to FIG. 8, the sender can write a custom note in field 830 or select from a list of available messages in a dropdown list 835. The note is a textual or graphical section that will not be sent to the recipient and will only be available to the sender, optionally as a reminder about the conversation with the recipient. In this exemplary embodiment, the dropdown list 835 has an option to include a note about a "large potential volume opportunity" 840. As shown in FIG. 9, when the "large potential volume opportunity" option 840 is selected, field 930 is populated with a message that says "Follow-up in two weeks to see how evaluation is progressing." The pre-written notes can be tailored to say anything that a host, administrator, vendor, attendee, or other participant desires.

Once the message is complete, the user can click the submit button to send the message. The application on the computing device transmits the message to the server, which can obtain information, such as an e-mail address, mobile phone number, or User ID associated with an identification number. The server can send the message to the recipient, which may be received by a mobile computing device that is present with the recipient at the event. Otherwise, the recipient can view messages at a computing device after the event. The message can be sent to the application executed on another computing device and/or a web-based or standalone email program on a computing device.

A User ID can be an identifier of account of the user for receiving and sending messages using a website, such as www.innovadex.com, rather than using a conventional e-mail application or a text message. The user can use the User ID and an associated password to access the messages in the account. A sender can also send a message to the User ID, which will be routed to the user's account and become available for the user to view, forward, delete, or otherwise manage once logged in with the User ID and password. The User ID may be used to identify a user instead of an e-mail address or text message number when the User ID is used within an authorized network or when sent by a sender logged into a system or a website allowing the use of a User ID.

Figure 25:
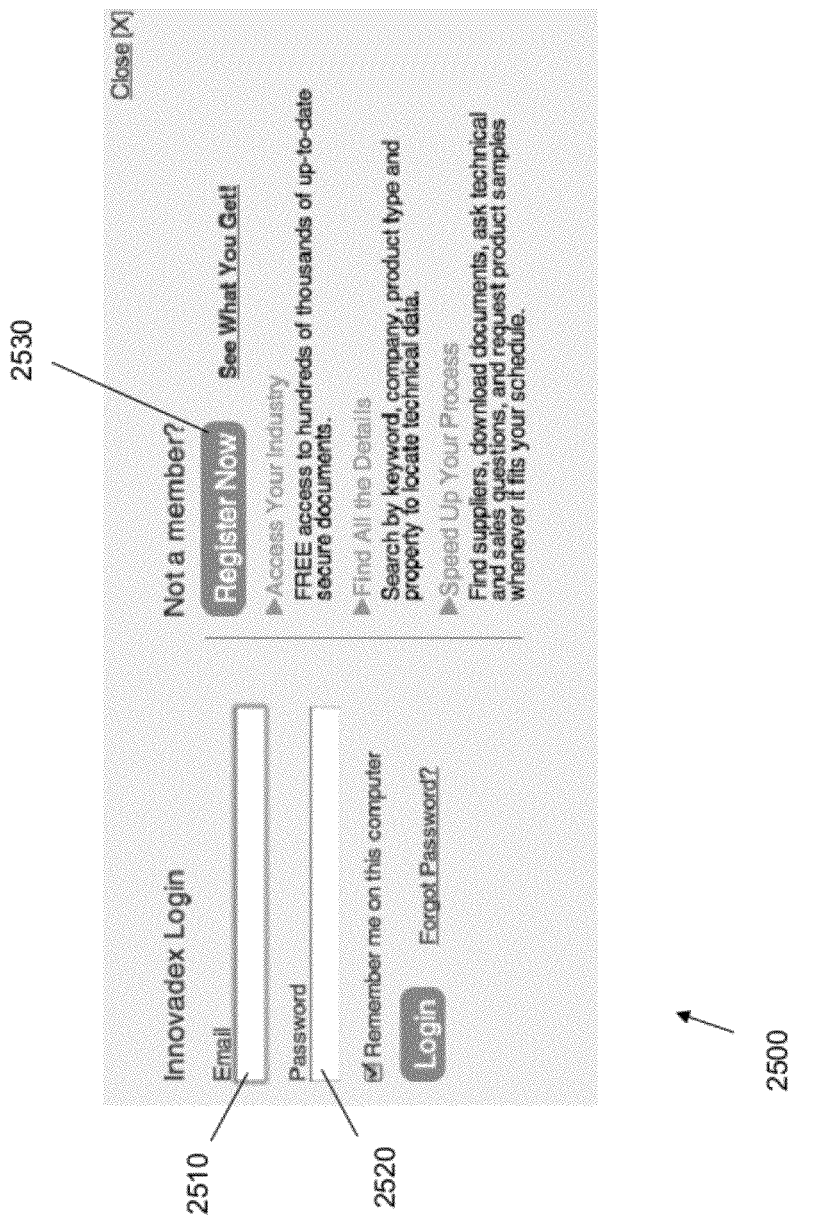
FIG. 25 depicts a screen on a computing device according to an exemplary embodiment.

Referring to FIG. 25, an exemplary web page or window 2500 is shown. This web page 2500 allows a user to login to an existing account using an email address in a text field 2510 and a password in a text field 2520, or the user can register for a new account by clicking on a "register" link 2530. The email address 2510 can be an entire email address (e.g., bruce.ianni@innovadex.com) or a User ID (e.g., BruceIanni) of the registered user. The User ID can be a short name, nick name, local-part of an e-mail address, user name, or other user identifier. When the user enters the User ID in the email address text field 2510, the system recognizes the account associated with the entered User ID. In the registration process, the user can select, create, or be assigned to a User ID.

Figure 26:
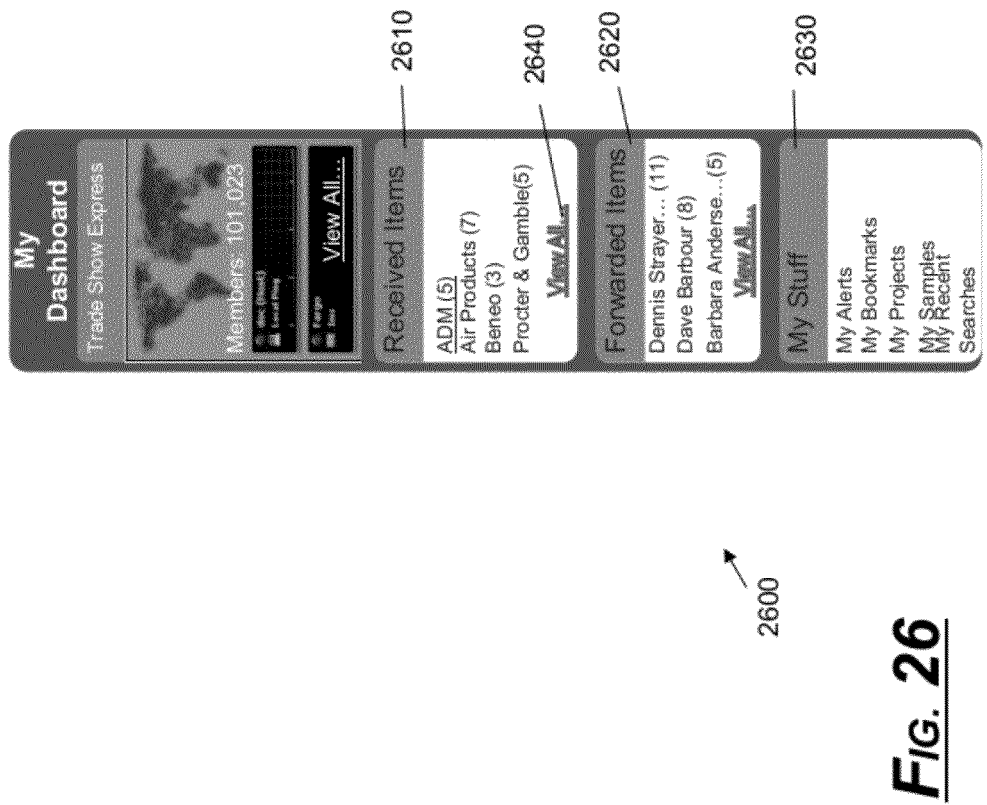
FIG. 26 depicts a screen on a computing device according to an exemplary embodiment.

Referring to FIG. 26, an exemplary "dashboard" 2600 is shown that can be displayed or presented on a web page, alongside a web page presenting other information, or in a separate window. The dashboard 2600 can include information about messages in the account. For example, the dashboard 2600 can show received items 2610, forwarded items 2620, and other customized options 2630, such as alerts, bookmarks, projects, samples, and recent searches. The received items 2610 and the forwarded items 2620 can be organized by the sender of the message, receiver of the message, company of the sender of the message, company of receiver of the message, product type, or product name. For example, in received items 2610, the messages are organized by a company name and show how many items are listed under each company name. By clicking on a "view all" link 2640, the user can see all of the items in that folder.

Referring to FIG. 27, a web page or window 2700 is shown whereby a user selected to see all items in the received items folder. The items listed include a company name 2710, an event name 2720, a sender 2730, and a date 2740. The items can be sorted by any of these categories or headings.

Referring to FIG. 28, by selecting a particular item, such a link 2810, which represents a company name and the number of items for that company (e.g., three items), in web page or window 2800, then all of the items 2820, 2830, 2840 for that company can be shown. Clicking a link for any item 2820, 2830, 2840 can open a web page or window that includes information from an internal database about the selected item, information from an external database about the selected item, or a web page or window from the company offering the item.

Figure 10:
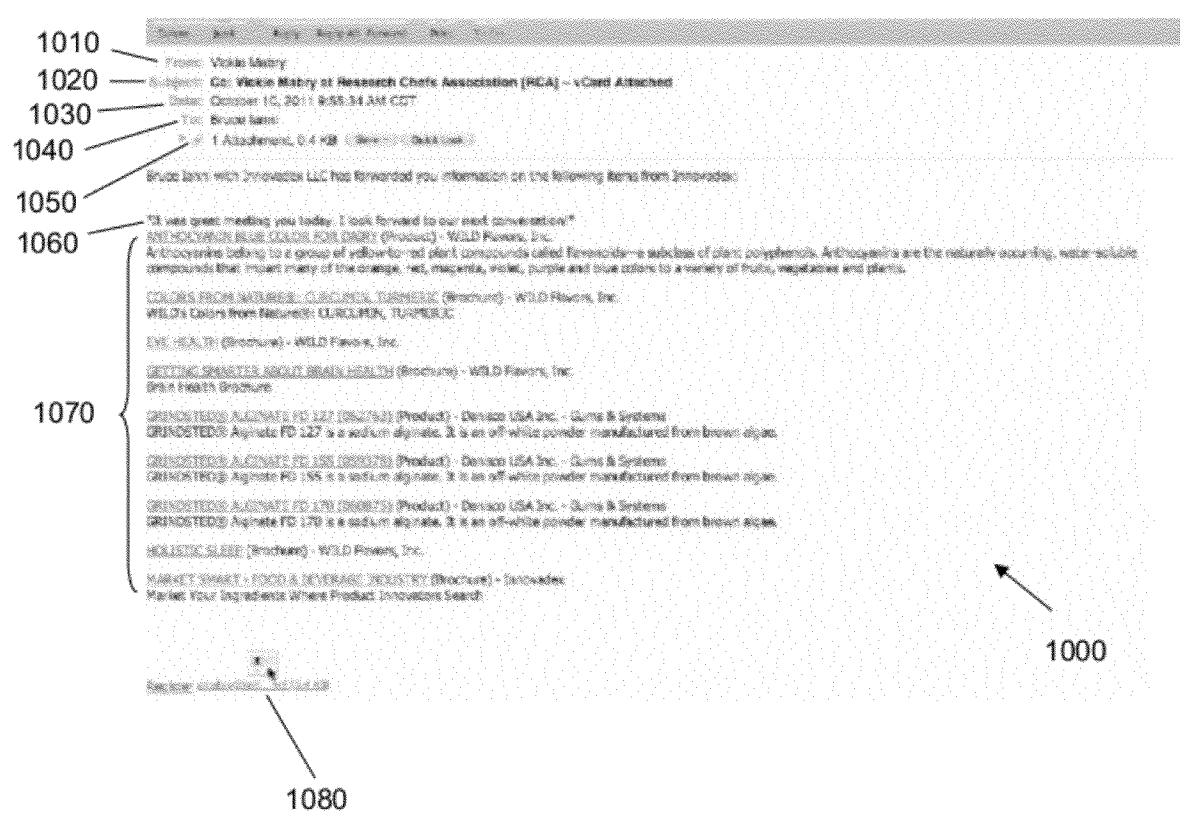

Referring to FIG. 10, an exemplary sent message 1000 is shown. The message includes the sender 1010, subject 1020, date 1030, recipient 1040, attachment(s) 1050, and a body of the message which includes message 1060, relevant search results 1070, and a vCard 1080 of the sender that is attached. A recipient can click on the vCard 1080 in the message 1000 to view details of the sender's contact information and incorporate or import the contact information into an address book of the recipient. Messages or notes from the interaction can be automatically included in the notes section of the vCard.

Referring back to FIG. 3, a screen 300 is shown on a computing device of a representative from Bunge Oils. In this exemplary embodiment, a scientist from another company is attending the event and visits the Bunge Oils representative at a booth. The scientist may be interested in a trans fat free cooking oil. So the representative from Bunge Oils can enter "trans fat free" in field 350 to search for products and services offered by Bunge Oils that satisfy the scientist's request. Once the phrase "trans fat free" has been entered in field 350, the representative can click a "search" button 360. The computing device can transmit a request over the network to the server to obtain this information from the database, which was previously loaded with the product information. Alternatively, the information can be stored locally on the computing device or accessible over a different network.

Figure 11:
FIG. 11 depicts a screen on a computing device according to an exemplary embodiment.

Referring to FIG. 11, a screen 1100 is displayed on the computing device with a list of search results 1110 whereby each item in the search results 1110 includes the phrase "trans fat free." Optionally, each item in the search results 1110 can have the requested phrase highlighted. The representative (i.e., vendor) or the scientist (i.e., attendee) can click on a particular item 1120 that is of interest to the scientist to view additional detail about that particular product or service.

Figure 12:
FIG. 12 depicts a screen on a computing device according to an exemplary embodiment.

Referring to FIG. 12, a screen 1200 is displayed on the computing device with detailed information about the selected item from the search results list. For example, the detailed information may include a name 1210 of the product or service, a company 1220 that offers the product or service, a description 1230 of the product or service, a datasheet 1240 of the product or service, and a brochure 1250 of the product or service. The screen 1200 can still display a business card icon 1260, bookmarks icon 1270, and new folder icon 1280, described above. The representative or the scientist can click on a link, such as the datasheet 1240 or brochure 1250 to view it on the computing device.

The representative can use the icon 1280 to create a folder for the scientist. The representative can rename the folder with any alphanumeric characters. In this example, the folder can be created for items where the scientist has interest. When viewing an item on screen 1200, the representative or scientist can drag a box 1290 to the folder icon 1280. By dragging the box 1290, the item shown on screen 1200 is included in the folder. In this exemplary embodiment, the box is a geometric shape, but it is intended that the vendor or attendee can drag, click, or activate any shape, object, characters, or links to include an item in the folder.

The selected item can be placed in the folder and sent to the attendee (e.g., scientist). By clicking on the folder icon, a list of items in the folder will be shown. One or more of the items can then be selected for transmission. If only one item is in the folder, then the item may appear by selecting the folder icon as opposed to displaying a list. In another embodiment, by selecting the item(s) a message window will appear to generate a new message.

Referring to FIG. 19, an alternative screen 1900 for information about a product or service is shown. In this alternative example, the screen 1900 shows the product name 1910, company 1920, description 1930, a "request sample" button 1940, a "bookmark" button" 1950, and a list of documents such as a datasheet 1960. By selecting the request sample button 1940, a new message can be generated that allows a sample to be requested.

Figure 13:
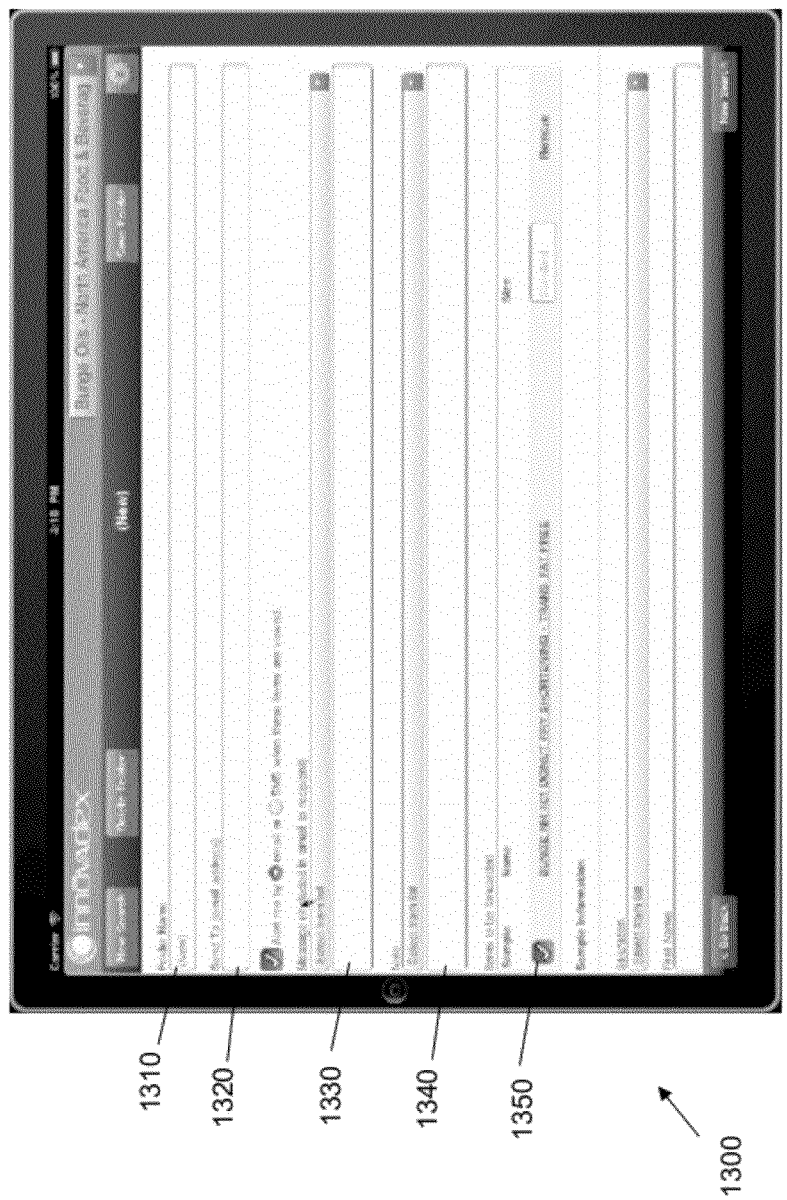
FIG. 13 depicts a screen on a computing device according to an exemplary embodiment.

As shown in FIG. 13, a new message 1300 is shown. The message 1300 has fields for the folder name 1310, recipient 1320, message 1330, and note 1340. These fields can be completed as discussed above with respect to FIGS. 4-9. The vendor or attendee can also choose whether to request a sample of the selected item by toggling a checkbox 1350. The message 1300 can also include address and contact information for sending the sample. Upon entering the recipient's identification (e.g., multi-digit number), the server can retrieve the contact information and populate the address and contact information appropriately.

Figure 14:
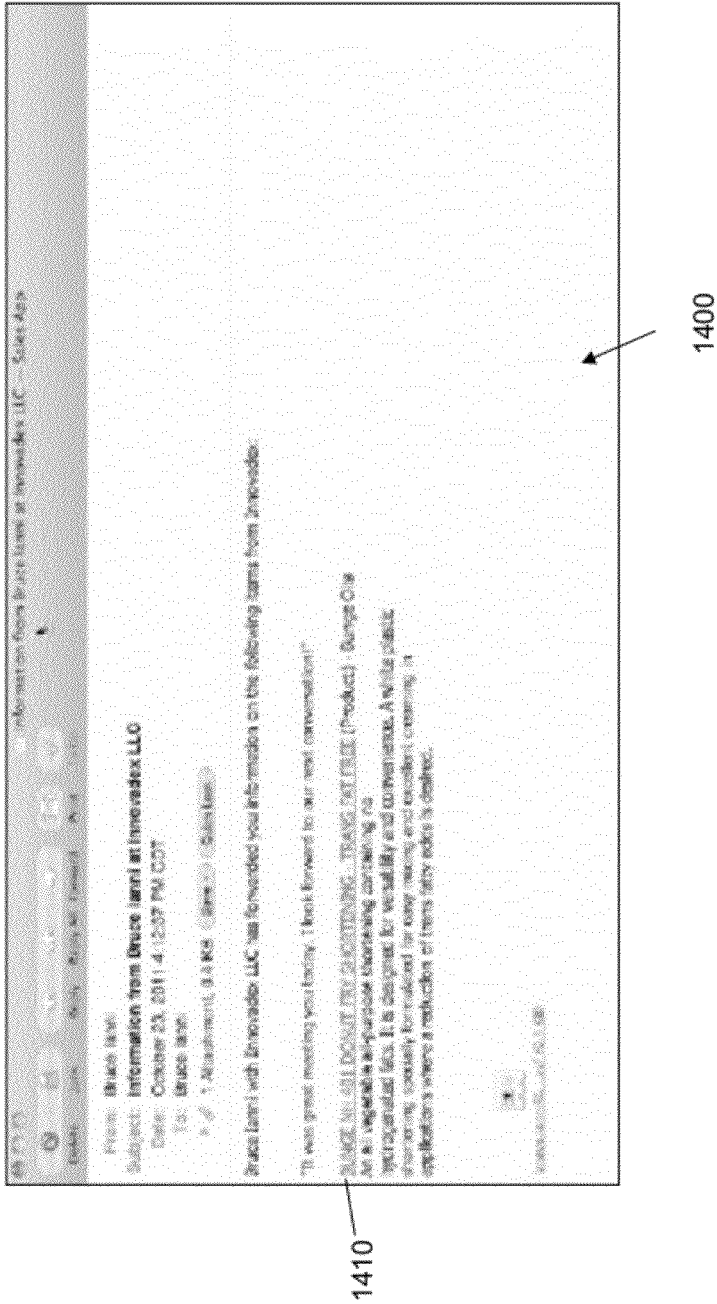
FIG. 14 depicts a screen on a computing device according to an exemplary embodiment.

During or after the event, the recipient can retrieve the message from an inbox of a web-based or standalone email program on a computing device or via recipient specific dashboard on a secured, user authenticated website. When the message is opened, the recipient can click on a link to review a brochure, datasheet, vCard, or other link or attachment within the message. For example, referring to FIG. 14, an email message 1400 is shown. When a recipient clicks on a link 1410 for an item listed in the message 1400, a product datasheet or brochure can be displayed. By selecting the link 1410, a request is transmitted to the server to retrieve the requested content from the database. Alternatively, once the link 1410 is selected, the requested content can be obtained from another location (e.g., a web server of the sender's company) and a notification can be sent to the server. Upon receiving the request or notification from the recipient, the server immediately initiates a text message or other message to the sender alerting them that the recipient is currently viewing the requested content. The sender can use this text message as a basis for determining whether to follow up with the recipient. In contrast, when distributing printed materials at an event, it is very difficult to determine whether these materials were actually reviewed after the event.

Referring to FIG. 20, an alternative received email message 2000 is shown based upon a request from the screen in FIG. 19. The message 2000 shows the sender 2010, subject 2020, date 2030, recipient 2040, message 2050, and a link to a product 2060.

Figure 15:
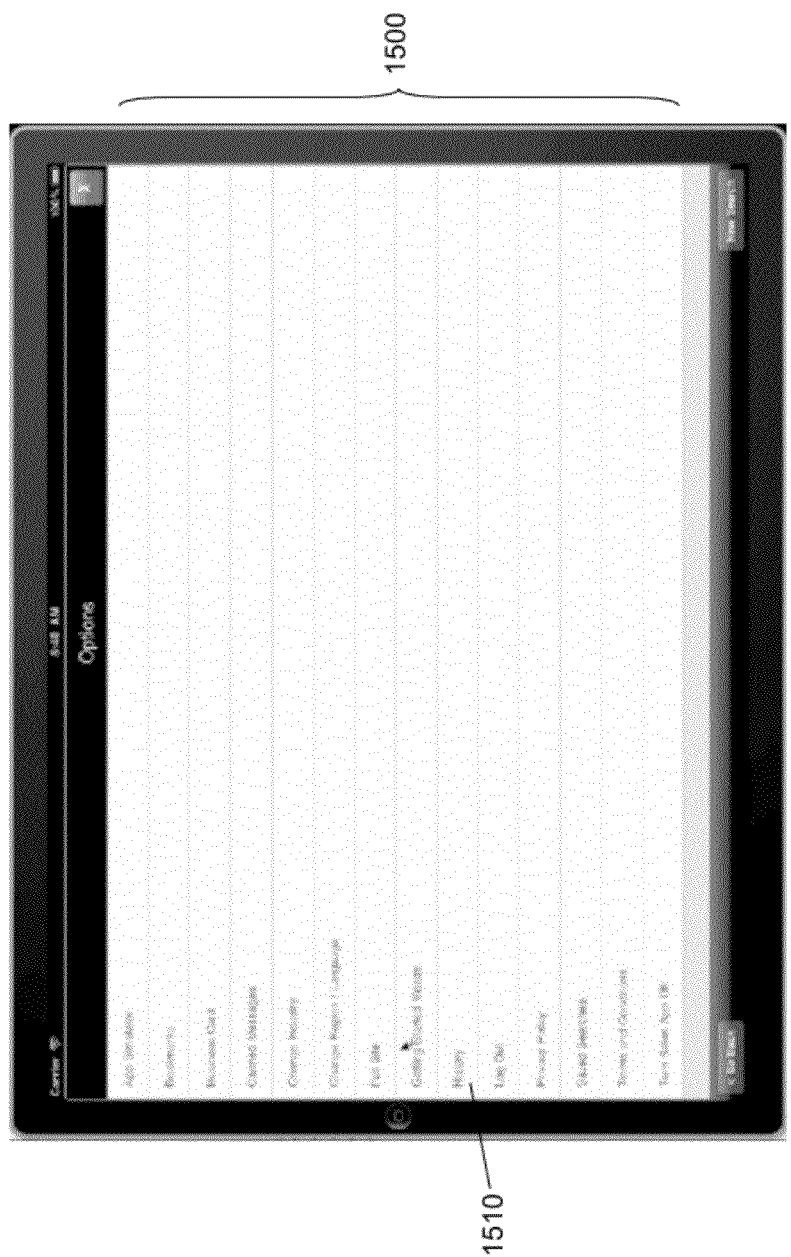
FIG. 15 depicts a screen on a computing device according to an exemplary embodiment.

Referring to FIG. 15, a vendor or attendee can view a list of options 1500 in the application. The options can include app simulator, bookmarks, business card, canned messages, change industry, change region/language, full site, getting started videos, history, log out, privacy policy, saved searches, terms and conditions, and turn sales app off. In one example, by selecting a history option 1510, a screen will be shown that lists all of connected vendors and/or attendees from a particular event or all events. After each event, the server can also email or otherwise transmit a listing of all connected vendors, attendees, as well as their contact information, products or services those participants were interested in, and any comments or notes about that participant or product. The listing can also provide a time-stamp confirmation and record of when the information was access by the recipient. This listing can be imported into a company's customer relationship management (CRM) system to allow for integration with existing sales and marketing systems. The listing can also include any notes, outbound messages, documents forwarded, and requests for samples.

Figure 21:
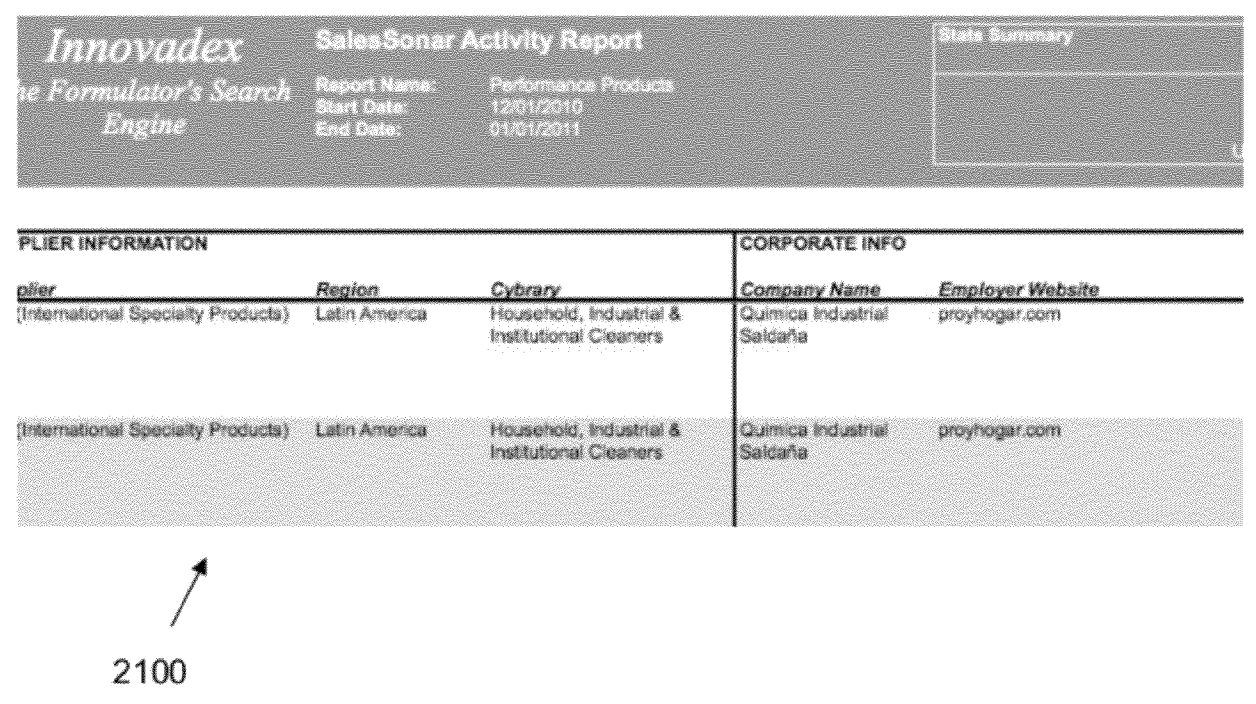

A report can be generated by the server, as shown in FIG. 21. The report 2100 can include activity regarding certain products or services discussed, identified, or requested during an event. For example, the report can include supplier information and corporate information for that supplier.

The embodiments described herein can provide a sales representative, such as a vendor, at an event with all of the company's product and service information and during customer contact. The product and service information can be readily recalled to provide to a customer looking for a certain specification. By using the search field, the representative can even obtain information about lesser known or less frequently discussed products and services. Documents or requests about products and services can be generated and transmitted substantially in real time, whereby the customer can receive information from a representative before the end of a conversation.

While it may be difficult to track whether a customer actually reads printed materials, the embodiments herein can allow for electronic document reporting where the representative knows if and when the customer views an electronic document. Information about receiving, opening, and any other activity regarding an electronic document can be provided and monitored in real time.

Figure 22:
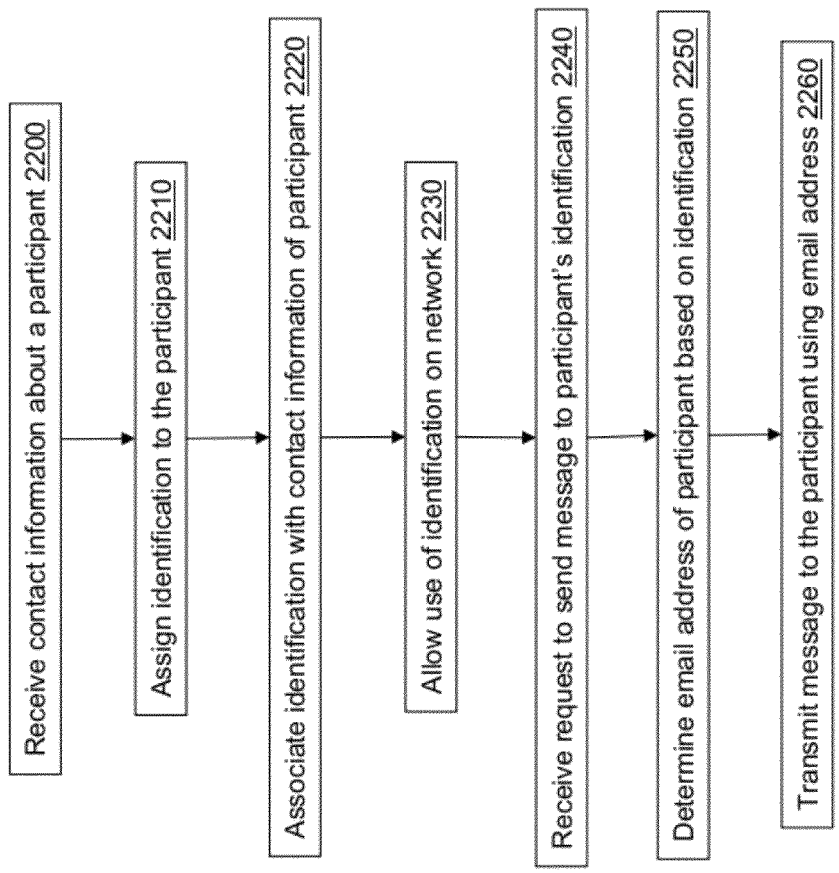
FIG. 22 depicts a flow chart of a method according to an exemplary embodiment.

Referring to FIG. 22, an exemplary computer-implemented method is shown. At 2200, a server receives contact information about a participant. At 2210, the server assigns an identification to the participant. At 2220, the server associates the identification with the contact information of the participant. At 2230, the server allows use of the identification on a network, wherein the network is limited to a geographic region. At 2240, the server receives a request transmitted over the network to send a message to the participant, wherein the request comprises the identification of the participant. At 2250, the server determines an email address or mobile phone number for SMS text message and User ID for a participant secured webpage based upon the identification in the request. At 2260, the server transmits the message to the participant using one or more of these communication methods.

Figure 23:
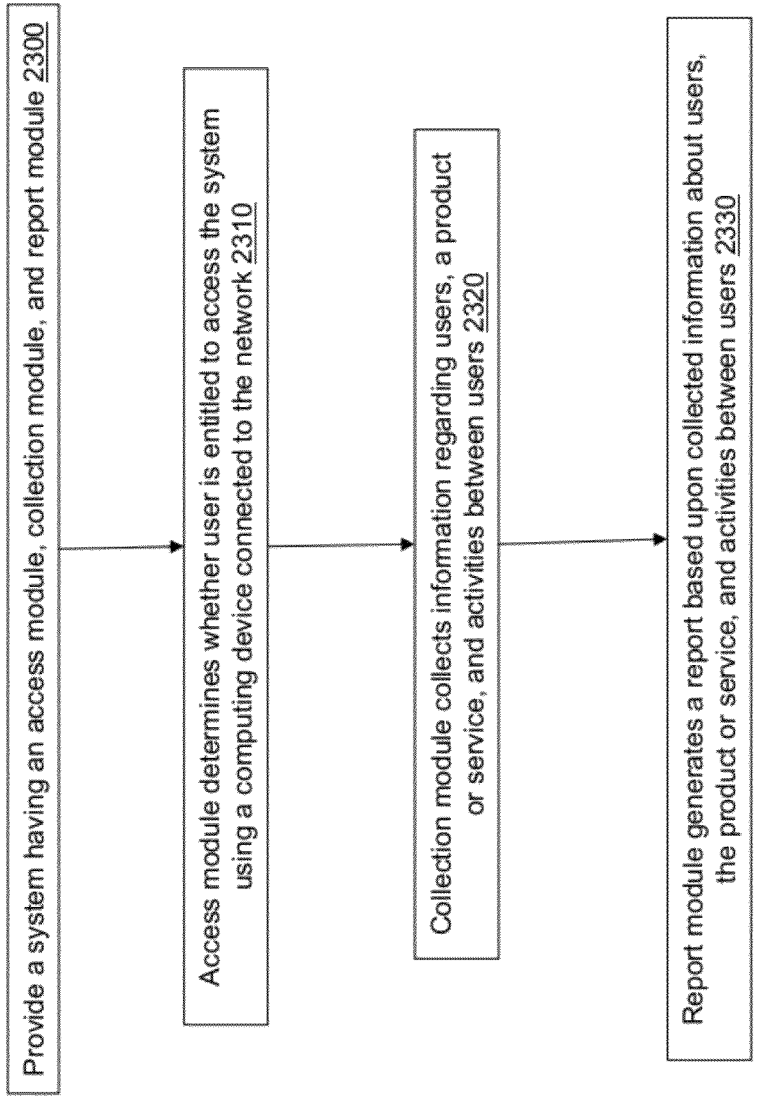
FIG. 23 depicts a flow chart of a method according to an exemplary embodiment.

Referring to FIG. 23, another exemplary computer-implemented method is shown. A computer program product comprises a tangible computer readable medium having computer readable program code embodied therein, and the computer readable program code is adapted to be executed to implement a method. At 2300, a system is provided, wherein the system comprises distinct software modules, and wherein the distinct software modules comprise an access module, a collection module, and a report module. At 2310, the access module determines whether a user is entitled to access the system using a computing device connected to a network. At 2320, the collection module collects information regarding users, a product or service, and activities between users accessing the system. At 2330, the report module generates a report based upon collected information regarding users, the product or service, and activities between users accessing the system.

Figure 24:
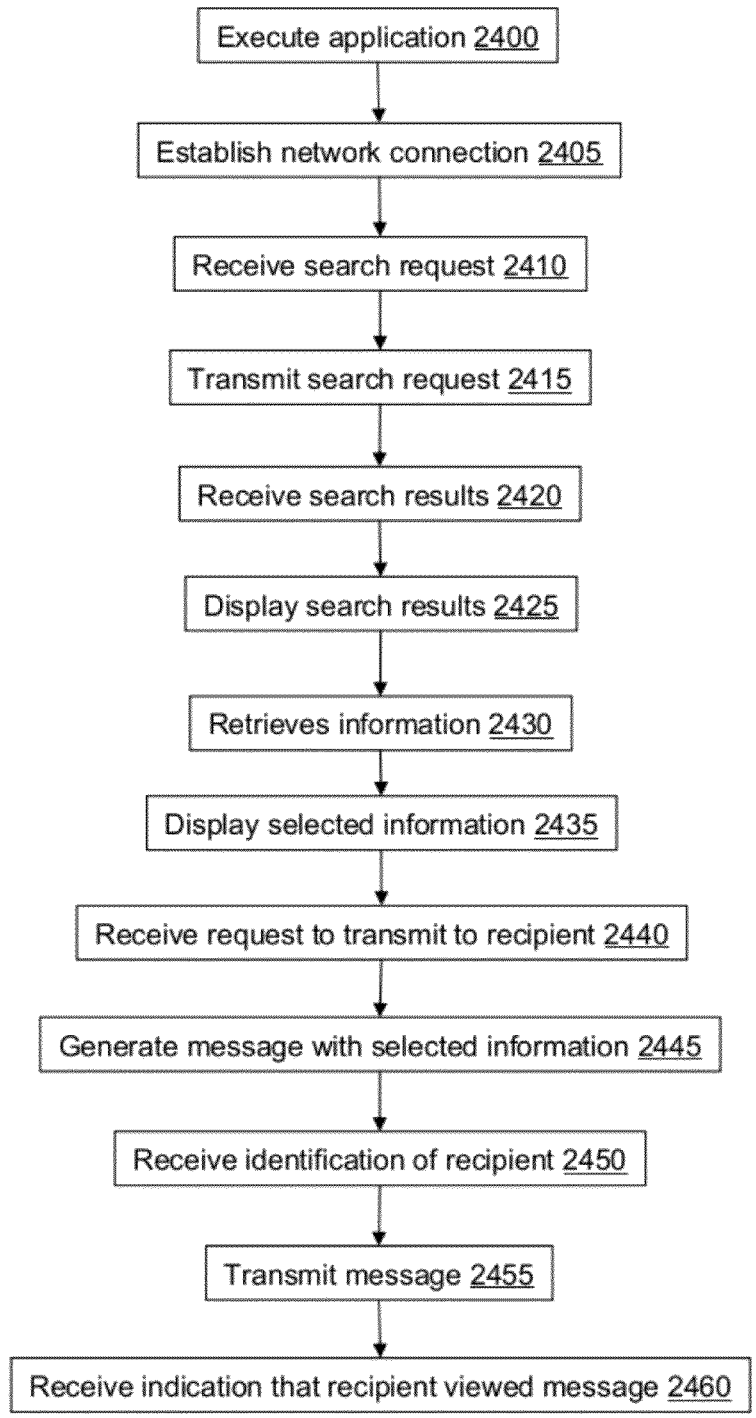
FIG. 24 depicts a flow chart of a method according to an exemplary embodiment.

Referring to FIG. 24, yet another exemplary computer-implemented method is shown. At 2400, a computing device executes an application for managing information about a product or service. At 2405, the computing device establishes a connection to a geographically-limited network. At 2410, the computing device receives a search request for a particular product or service. At 2415, the computing device transmits over the network the search request to a server for determining whether a database comprises information about the particular product or service. At 2420, the computing device receives over the network search results from the server that comprise information about the particular product or service. At 2425, the computing device displays the search results on a screen of the computing device; receiving, by the computing device, a selection of at least a portion of the search results. At 2430, the computing device retrieves over the network information based upon the selection of at least a portion of the search results. At 2435, the computing device displays the selected information on the screen of the computing device. At 2440, the computing device receives a request to transmit the selected information to a recipient. At 2445, the computing device generates a message incorporating the selected information. At 2450, the computing device receives an identification of the recipient for transmitting the message, wherein the identification does not include the name or email address of the recipient. At 2455, the computer device transmits over the network the message to the recipient, whereby a server receives the message and converts the identification to a communication method based upon an association of the identifier with the identification of the recipient. At 2460, the computing device receives over the network an indication that the recipient has viewed the information in the message.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "identifying" or "detecting" or "assigning" or "associating" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

It is also to be understood that the following claims are intended to cover all of the generic and specific features of the invention herein described, and all statements of the scope of the invention which, as a matter of language, might be said to fall there between.

What is claimed is:

1. A computer-implemented method for transmitting information, the method comprising:
   receiving, by a server, contact information about an attendee;
   assigning, by the server, an identification to the attendee, wherein the identification does not include the name or email address of the attendee;
   associating, by the server, the identification with the contact information of the attendee;
   allowing, by the server, use of the identification on a network associated with an event, wherein the network is available only during the event;
   receiving, by the server, a request transmitted over the network from a computing device of a vendor to send a message to the attendee, wherein the request comprises the identification of the attendee;
   determining, by the server, a method of communication of the attendee based upon the identification in the request; and
   transmitting, by the server, the message to the attendee using the method of communication.

2. The method according to claim 1, further comprising:
   receiving, by the server, information about a product or service of a vendor;
   storing, by the server, the information about the product or service in a database;
   allowing, by the server, access to the information about the product or service on the network;
   receiving, by the server, a request transmitted over the network for information about the product or service;
   retrieving, by the server, the information about the product or service from the database; and
   providing, by the server, the requested information over the network.

3. The method according to claim 2, wherein the message comprises a link to information about products or services stored in the database, further comprising:
   receiving, by the server, a selection by the attendee of the link in the message; and
   providing, by the server, an indication to the vendor that the attendee has selected the link for information about the product or service.

4. The method according to claim 1, wherein the identification comprises a sequence of alphanumeric characters.

5. The method according to claim 1, wherein the identification comprises a barcode or QR code.

6. The method according to claim 1, wherein the identification is printed on a nametag of the attendee.

7. The method according to claim 1, wherein the network is limited to a geographic region, and the geographic region is selected from the group consisting of a building, a room, a campus, and a convention center.

8. A computer-implemented method for transmitting information, the method comprising:
   executing, by a computing device of a vendor, an application for managing information about a product or service;
   establishing, by the computing device of the vendor, a connection to a geographically-limited network associated with an event, wherein the network is available only during the event;
   receiving, by the computing device of the vendor, a search request for a particular product or service from the vendor;
   transmitting, over the network by the computing device of the vendor, the search request to a server for determining whether a database comprises information about the particular product or service;
   receiving, over the network by the computing device of the vendor, search results from the server that comprise information about the particular product or service;
   displaying, by the computing device of the vendor, the search results on a screen of the computing device of the vendor;
   receiving, by the computing device of the vendor, a selection of at least a portion of the search results of the vendor;
   retrieving, over the network by the computing device of the vendor, information based upon the selection of at least a portion of the search results;
   displaying, by the computing device of the vendor, the selected information on the screen of the computing device of the vendor;
   receiving, by the computing device of the vendor, a request to transmit the selected information to an attendee;
   generating, by the computing device of the vendor, a message incorporating the selected information;

receiving, by the computing device of the vendor, an identification of the attendee for transmitting the message, wherein the identification does not include the name or email address of the attendee;

transmitting, over the network by the computing device of the vendor, the message to the attendee, whereby a server receives the message and converts the identification to an email address, an SMS text message address, or a website User ID based upon an association of the email address, SMS text message address, or the website User ID with the identification of the attendee; and receiving, over the network by the computing device of the vendor, an indication that the attendee has viewed the information in the message.

9. The method according to claim 8, wherein the identification comprises a sequence of alphanumeric characters.

10. The method according to claim 8, wherein the identification comprises a barcode or QR code.

11. The method according to claim 8, wherein the identification is printed on a nametag of the attendee.

12. The method according to claim 8, wherein the geographically-limited network is limited to a building, a room, a campus, or a convention center.

13. The method according to claim 8, wherein the network is only accessible by the computing device during the occurrence of an event.

14. The method according to claim 8, further comprising requesting, over the network by the computing device, a report regarding activity involving the vendor and any product or service.

15. The method according to claim 8, further comprising:
   receiving, by the computing device, a command to add a search result to a folder associated with the attendee; and
   generating, by the computing device, a message to the attendee incorporating the contents of the folder.

16. The method according to claim 8, further comprising receiving, by the computing device, an indication to include in the message that the attendee desires to receive a sample of a product or service.

\* \* \* \* \*